(12) United States Patent
Martin et al.

(10) Patent No.: US 6,932,100 B2
(45) Date of Patent: Aug. 23, 2005

(54) FLAPPER TYPE FILL TUBE CHECK VALVE

(75) Inventors: Charles J. Martin, Ann Arbor, MI (US); Christopher W. Creager, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 87 days.

(21) Appl. No.: 10/444,658

(22) Filed: May 23, 2003

(65) Prior Publication Data

US 2004/0231728 A1 Nov. 25, 2004

(51) Int. Cl.$^7$ ............................................. F16K 15/03
(52) U.S. Cl. ........................... 137/15.18; 137/315.16; 137/527; 137/527.6; 137/592; 251/337
(58) Field of Search .................. 137/15.18, 315.16, 137/315.33, 515, 515.5, 527, 527.4, 527.6, 590, 592; 251/337

(56) References Cited

U.S. PATENT DOCUMENTS

| | | | | |
|---|---|---|---|---|
| 3,926,216 A | * | 12/1975 | Rulcker | 137/527.8 |
| 4,586,534 A | * | 5/1986 | McNeely | 137/515.7 |
| 4,825,902 A | * | 5/1989 | Helms | 137/515 |
| 5,027,868 A | * | 7/1991 | Morris et al. | 141/59 |
| 5,159,953 A | | 11/1992 | Sato et al. | |
| 5,327,933 A | * | 7/1994 | Ishikawa et al. | 137/527.6 |
| 5,431,199 A | * | 7/1995 | Benjay et al. | 141/59 |
| 5,887,615 A | * | 3/1999 | Goto et al. | 137/527.6 |
| 6,152,199 A | | 11/2000 | Nusbaumer et al. | |
| 6,240,957 B1 | * | 6/2001 | Hattori | 137/527.6 |
| 6,575,190 B1 | * | 6/2003 | Rosseel et al. | 137/512.15 |
| 2001/0013367 A1 | | 8/2001 | Miura et al. | |

FOREIGN PATENT DOCUMENTS

DE  200 01 334 U1  3/2001

* cited by examiner

Primary Examiner—Ramesh Krishnamurthy
(74) Attorney, Agent, or Firm—Anna M. Shih; Roger A. Johnston

(57) ABSTRACT

A flapper valve for push-in snap-lock attachment to a spud to be welded to a fuel tank and attached to a flexible filler tube hose. The flapper has an annular flexible seal overmolded thereon, preferably of elastomeric material. The flapper has a pair of trunnions, one of which has an extension or spindle with a torsion spring received thereover with one end of the torsion spring slidably anchored to a post on the flapper to form a flapper subassembly. The opposite end of the torsion spring is deflected to fit in a slot or groove in the body when the trunnions are snapped into slots formed by deflectable fingers formed integrally on the exterior of the tubular valve body for pivoting the flapper. Deflector vanes are provided on the upstream side of the flapper to protect the seal from the end of a siphon hose.

22 Claims, 5 Drawing Sheets

FLAPPER TYPE FILL TUBE CHECK VALVE

BACKGROUND OF THE INVENTION

The present invention relates to one way valves and particularly flapper type valves which are employed in a fuel tank filler tube for accommodating insertion of a refueling nozzle and providing for closure and sealing of the filler tube upon removal of the nozzle at the completion of refueling.

In the current production of truck and passenger vehicles, mandated fuel vapor emission requirements necessitate the sealing of the fuel tank to prevent escape of fuel vapor to the atmosphere. Present design practice is to provide a one-way valve in the fuel tank filler tube and located downstream of an aperture and seal provided for sealing about a refueling nozzle upon insertion of same in the filler tube. This arrangement thus prevents escape of fuel vapor to the atmosphere from the filler tube both during refueling and upon removal of the refueling nozzle.

Presently, a greater number of motor vehicle fuel tanks are formed of non-metallic material; however, metal fuel tanks are still employed on production vehicles and consequently provision must be made for providing a check valve in the filler tube for both metal and plastic fuel tanks. Typically, the upper section of the filler tube, which is attachable to the vehicle structure in light trucks and passenger cars, is formed of flexible material with a tubular flanged fitting or "spud", as it is sometimes referred to, is attached to the downstream end thereof. The spud is secured and sealed to the tank typically by weldment.

Furthermore, the one-way valve must accommodate insertion of a siphon hose in the filler tube such that the hose can pass through the valve and into the tank with the lower end of the hose contacting the bottom of the fuel tank. Thus, it has been found convenient to have the downstream end of the one-way valve extend into the fuel tank and to have oriented apertures in the side of the valve to direct the siphon hose toward the bottom of the tank. This has required proper rotational orientation of the valve in the tank spud and the spud on the tank in order to provide for directing the siphon hose to the bottom of the tank.

In addition, it has been desired to provide a relatively low cost design for attaching the flapper valve element to the valve body and to provide for biasing the flapper to the closed position and self alignment to ensure automatic closing upon removal of a fuel filler nozzle or siphon hose.

Heretofore, it has proven difficult in manufacturing and assembly of such a valve to provide for biasing the flapper closed in a manner which was cost effective in high volume production and easy to assemble. Furthermore, it has been found relatively costly and difficult to provide a pivot or hinge mechanism for pivoting the flapper and to attach the flapper to the valve body in a manner which ensures positive closing self alignment and sealing of the flapper to prevent emission of fuel vapor. Thus, it has been desired to provide a simple, easy-to-assemble and relatively low cost one-way flapper valve for a fuel tank filler tube which readily receives a siphon hose and which is orientable in the filler hose to direct the siphon hose toward the bottom of the tank.

It has further been desired to provide a fuel tank filler tube valve which can accommodate attachment to either a metal or plastic tank spud and which has a minimum number of parts to simplify assembly and minimize manufacturing costs.

BRIEF SUMMARY OF THE INVENTION

The present invention provides a fuel tank filler tube flapper valve which has a flapper with integral pivot trunnions thereon with the flapper having an annular resilient seal disposed thereon and a torsion spring mounted on the trunnions with one end secured to the flapper to form a sub-assembly. The flapper trunnions are snap locked into pivot recesses formed on a valve body by a member with deflectable fingers which permits rapid assembly during the manufacture of the valve. The recesses are preferably elongated slots permitting limited trunnion movement which facilitates self alignment of the annular seal on the valve seat formed on the body and ensuring a positive seating of the seal.

The tubular body includes raised surfaces on the exterior thereof for engaging corresponding surfaces in the fuel tank spud for rotationally orienting the flapper valve on the spud and subsequently the tank. Deflector ribs formed on the upstream side of the flapper are oriented to deflect a siphon hose inserted in the filler neck away from the resilient seal on the flapper to prevent damage to the seal in the event that siphoning is required. The valve body has surfaces thereon providing for snap-in attachment to a plastic tank spud and push in attachment to a metal tank spud in which latter case the spud is crimped over a flange on the valve.

DETAILED DESCRIPTION OF THE INVENTION

Figure 1:
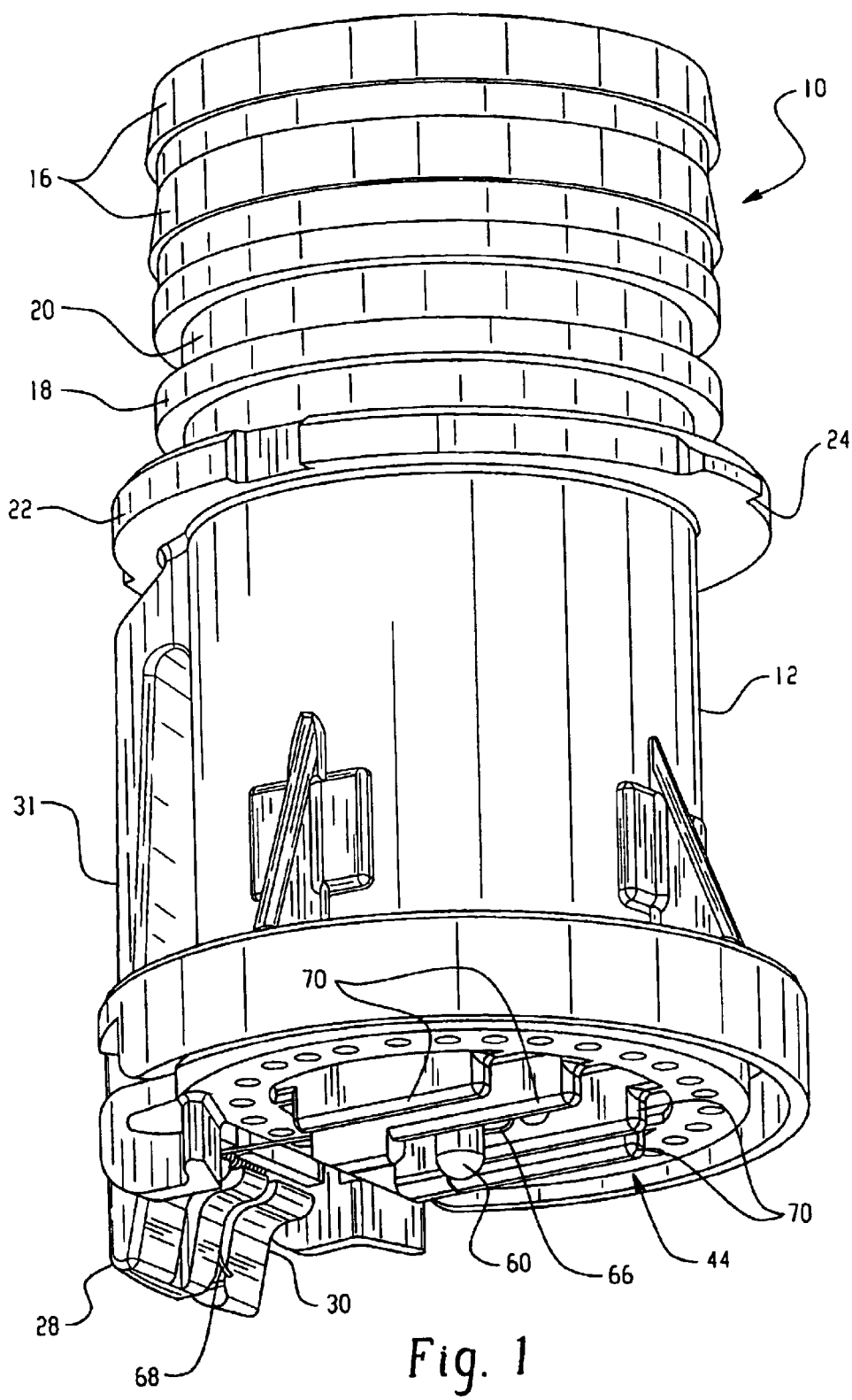
FIG. 1 is a perspective view of the valve assembly of the present invention.
Figure 2:
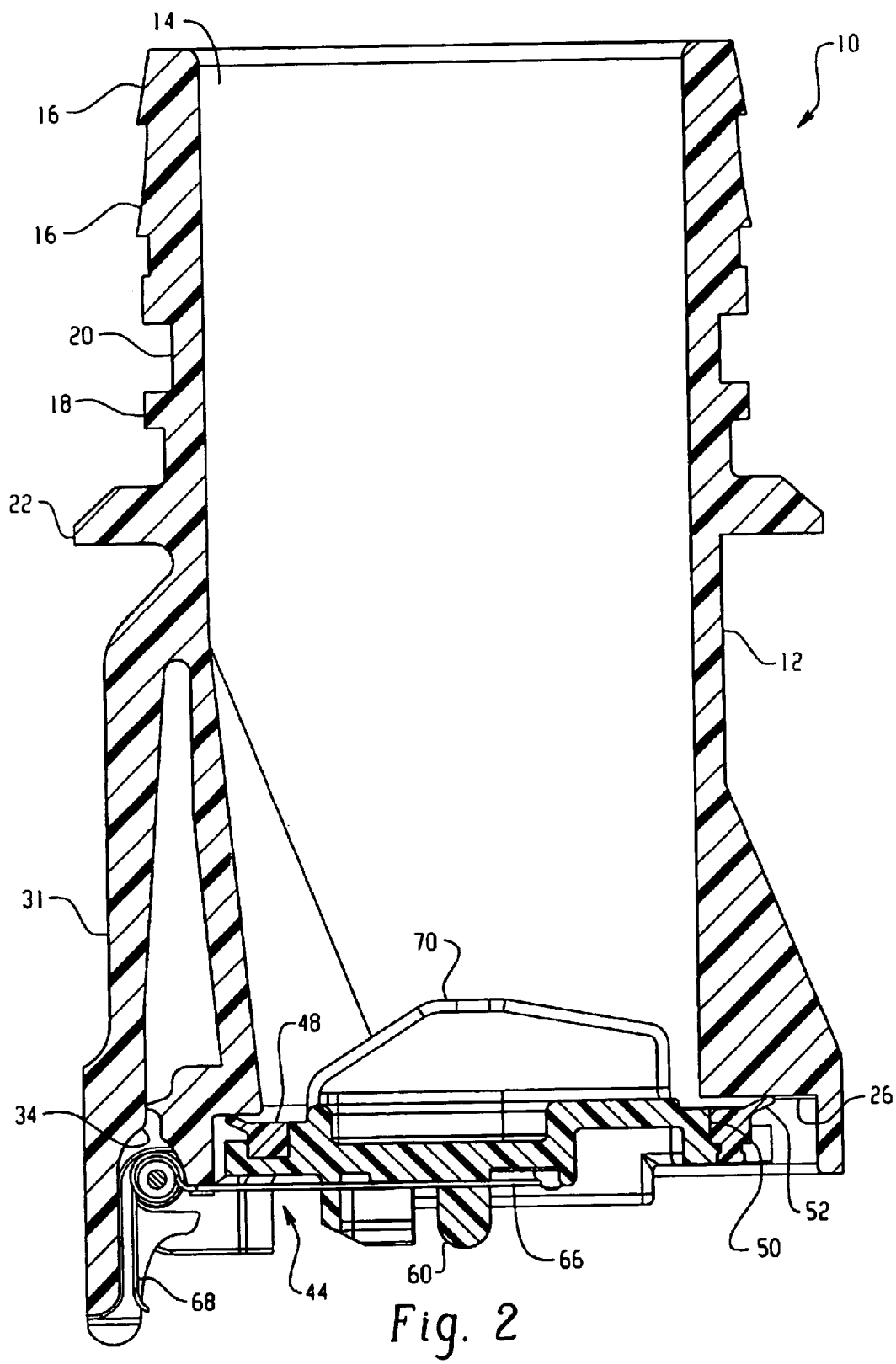
FIG. 2 is a cross-section of the valve of FIG. 1 showing the valve installed in a fuel tank spud and connected to a filler neck.
Figure 3:
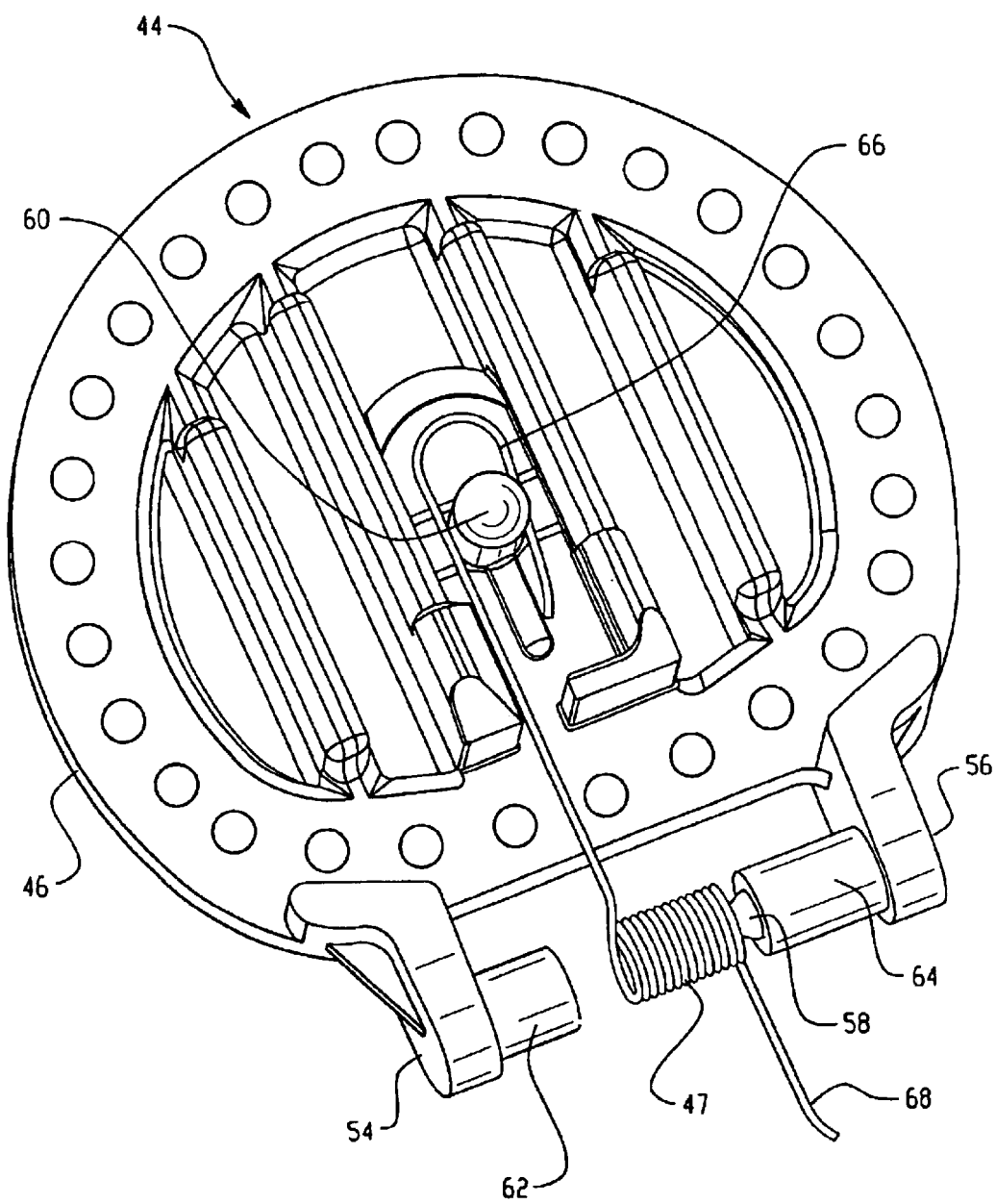
FIG. 3 is a perspective view of the flapper sub-assembly of the embodiment of FIG. 1.

Referring to FIGS. 1 through 3, the valve assembly of the present invention is indicated generally at 10 and includes a tubular body 12 having an inlet 14 with annular barbs 16 disposed about the outer surface of the inlet end of the tubular body 12 to facilitate connection to the fuel tank spud as will hereinafter be described. The body has an annular flange 18 downstream of the barbs 16, which flange forms an annular groove 20 adapted for receiving a resilient seal ring therein.

The body has a radially outwardly extending annular flange 22 formed thereon downstream of flange 18; and, flange 22 has a radially outwardly extending projection 24 thereon for providing orientation of the valve in a spud as will hereinafter be described.

The lower end of the body 12 remote from inlet 14 has formed thereon an annular valve seat 26.

Figure 4:
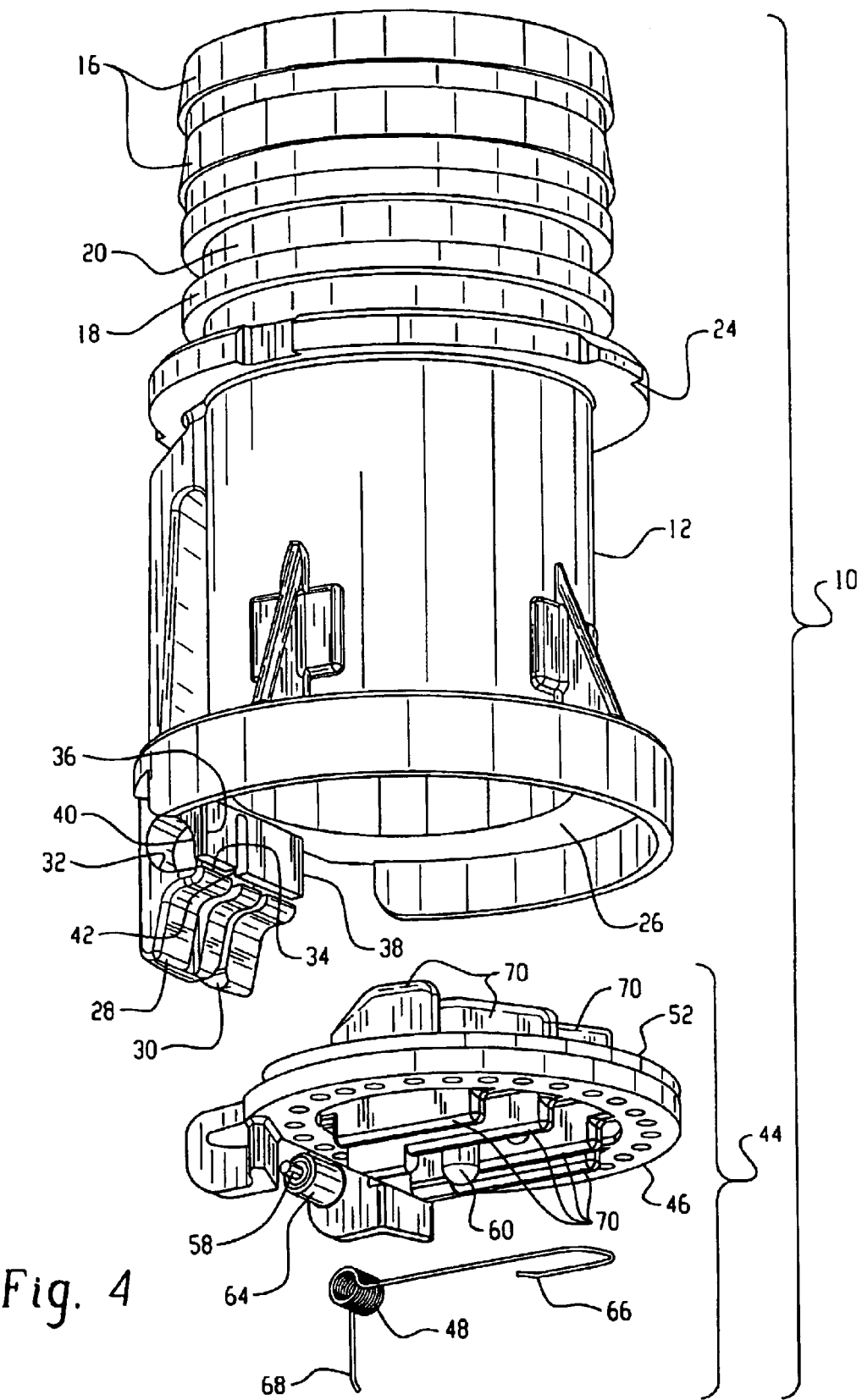
FIG. 4 is an exploded view of the valve of FIG. 1.

The exterior of the body has provided thereon and preferably formed integrally therewith a member 31 which is preferably resiliently deflectable with a pair of fingers 28, 30 which extend axially therefrom and preferably beyond the lower end of the tubular body and may be configured so as to be elastically deflectable. The fingers 28, 30 each cooperate with the body to form a recess therein configured to cooperate with the body to form a slightly or somewhat elongated slot denoted respectively 32, 34. The lower end of the tubular body 12 has a corresponding pair of axial projections 36, 38, each of which has corresponding surfaces formed thereon denoted respectively 40, 42 to form preferably the greater portion of the slots 32, 34. In the presently preferred practice of the invention, the slots 32, 34 including the corresponding surfaces 40, 42 have their direction of elongation inclined slightly to the axis of the tubular body as shown in FIGS. 2 and 4.

Referring to FIGS. 1 through 4, a flapper subassembly indicated generally at 44 includes a flapper member 46 and a torsion spring 48 which is assembled thereon as will hereinafter be described in greater detail.

Flapper 46 has a flexible annular seal 48 which may be disposed in a groove 50 formed therein; and, seal 48 is preferably overmolded of elastomeric material and preferably configured to have a relatively thin flexible wiper portion 52 for seating on valve surface 26 and providing a positive fuel vapor seal thereon as shown in FIG. 2. In the presently preferred practice of the invention, the valve surface 26 and seal 48 are formed to have a "D" shaped configuration in plan view to permit the tubular body to be shaped to accommodate the trunnions, fingers and slots. The seal 48 may be formed of silicone or neoprene elastomer.

Flapper 46 further has a pair of lugs projecting outwardly therefrom as denoted respectively by reference numerals 54, 56 in spaced preferably parallel relationship. The lugs 54, 56 each respectively has a trunnion extending therefrom in axially aligned relationship and extending toward the midpoint between lugs 54, 56. One of the lugs 54, 56 is provided with an axially extending spindle portion 58 of reduced diameter which has the coil of a torsion spring 47 received thereover.

The flapper 46 has a post 60 located in the central region of the flapper and extending outwardly therefrom and preferably located on a line normal to the axis of the trunnions and passing through spindle 58.

The torsion spring 47 has one end thereof formed to a hook-shaped configuration as denoted by reference numeral 66 which is slidably registered against the post 60 for locating the coil of the spring 47 on the spindle 58. The opposite end of spring 47, denoted by reference numeral 68, is shown in its free position extending in an opposite direction and generally in parallel relationship to the hooked end of the spring 66.

Flapper 46 has a plurality of spaced fins or vanes 70 extending from the face of the flapper containing seal 48. Vanes 70 are chamfered so as to direct a siphon hose inserted through inlet 14 away from the seal 48.

Referring to FIGS. 1, 2 and 4, the flapper subassembly is installed on the body 12 by deflecting the fingers outwardly so as to permit the trunnions to be received in the slots 32, 34 whereupon the fingers 28, 30 return to the position shown in solid outline in the drawings. The free end 68 of the spring 47 is positioned as shown in FIG. 4 and is registered in a groove or slot formed between the fingers 28, 30. Thus the end 68 of the spring in the installed position is rotated by about 90 degrees with respect to end 66 from its free position and thereby provides a torsional preload on the flapper 46 to bias the flapper in a direction to seat the wiper 52 on the valve seat 26. The inclined slots 32, 34 permit limited transverse movement of the flapper to ensure self alignment of seal 48 on surface 26.

Figure 5:
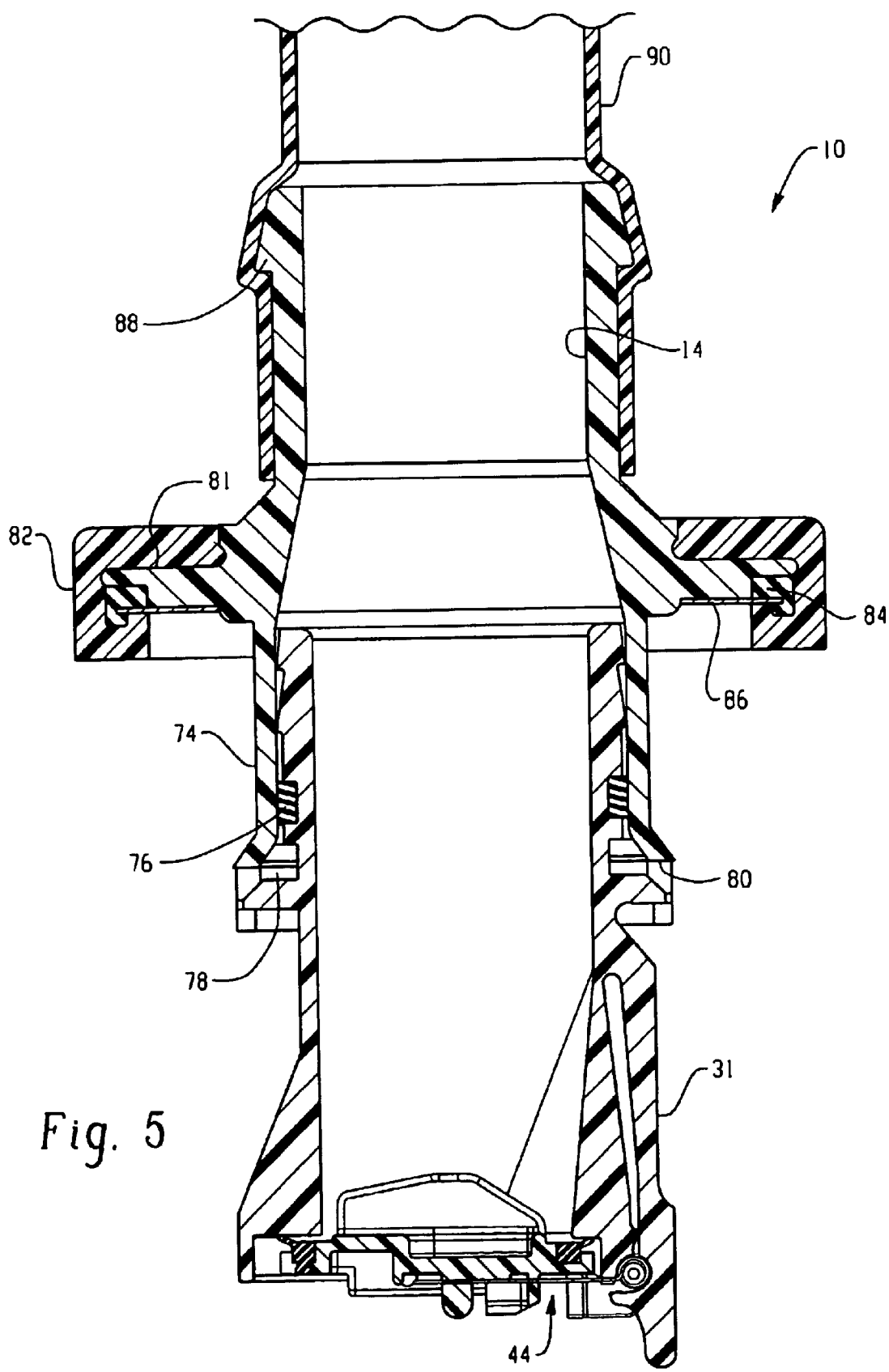
FIG. 5 is a cross section of the valve of FIG. 1 assembled to a fuel tank spud and filler tube hose.

Referring to FIG. 5, the assembly 10 of the present invention is shown with the annular barbs 16 inserted in the lower end of a fuel tank spud 74 formed of non-metallic material such as plastic and sealed therein by a suitable annular seal such as an o-ring 76. The lower end of spud 74 is somewhat enlarged and has a pair of slots 78, 80 formed therein into which are snapped the projections 24 formed on the flange 22 of the valve body. Thus, the valve is rotationally oriented within the spud and secured axially therein. Spud 74 has a radially outwardly extending flange 81 which is overmolded with material weldable to the fuel tank as denoted by reference numeral 82; and, flange 81 has disposed thereon a resilient flexible annular seal 84 preferably formed of elastomeric material which is attached to a washer 86 for pre-placement in a mold (not shown) to facilitate the overmolding.

The upper end of spud 74 has an annular barb 88 formed therein which is pushed into the lower end of a flexible tank filler hose 90 to complete the assembly to the filler tube.

The present invention thus provides a low cost, easy to assemble and install one-way valve for a fuel tank filler tube; and, the valve of the present invention is adapted for push-in snap-lock connection to a spud which is subsequently attached to the fuel tank by weldment.

Although the invention has hereinabove been described with respect to the illustrated embodiments, it will be understood that the invention is capable of modification and variation and is limited only by the following claims.

What is claimed is:

1. A check valve assembly for a fuel tank filler tube comprising:
   (a) a tubular body with a distal end forming an inlet and including first surfaces thereon adapted for connecting to a fuel filler tube for receiving fuel therefrom during refueling of the tank and second surfaces for connecting to a fuel tank spud;
   (b) a valve seat formed on an end of said body proximal said second surfaces;
   (c) said body having a plurality of deflectable portions formed on the exterior thereof adjacent said valve seat and including detent surfaces thereon;
   (d) a flapper having a plurality of integral trunnions thereon with one of said trunnions having an extension thereon; and,
   (e) a torsion spring received over said extension with one reaction end thereof contacting said flapper, with said trunnions disposed in pivotal engagement with said deflectable portion of said body and an opposite reaction end of said spring contacting the exterior of said body, wherein said spring biases said flapper in a direction to contact said valve seat.

2. The valve assembly defined in claim 1, wherein said flapper includes a raised surface thereon having said one reaction end of said spring slidably anchored thereto.

3. The valve assembly defined in claim 1, wherein said flapper includes an annular flexible seal disposed thereon for contacting said valve seat.

4. The valve assembly defined in claim 3, wherein said flapper includes a plurality of raised surfaces on the upstream side thereof for preventing a siphon hose upon insertion in said body, from contacting said annular seal.

5. The valve assembly defined in claim 3, wherein said annular seal is formed of elastomeric material.

6. The valve assembly defined in claim 1, wherein said deflectable portions of said body form a plurality of elongated apertures with said trunnions received therein.

7. The valve assembly defined in claim 1, wherein said direction of elongation of said apertures is inclined to the axis of said tubular body.

8. The valve assembly defined in claim 1, wherein said body includes engagement surfaces on the exterior operable to engage corresponding surfaces in a tank spud for orienting said flapper.

9. The valve assembly defined in claim 1, wherein said extension is co-axial with said one trunnions.

10. The valve assembly defined in claim 1, wherein said spring is assembled to said extension to form a flapper subassembly.

11. The valve assembly defined in claim 1, wherein said deflectable portions comprise a pair of deflectable fingers, each having a recess therein with one of said trunnions pivotally received therein.

12. The valve assembly defined in claim 1, wherein said deflectable portion cooperates with said body to form inclined slots for receiving said trunnion.

13. The valve assembly defined in claim 1, wherein said flapper includes an elastomer seal overmolded thereon.

14. The valve assembly defined in claim 1, wherein said seal is formed of one of silicone and neoprene elastomer.

15. A method of making a check valve for a fuel tank filler tube comprising:
   (a) providing a tubular body and forming first surfaces thereon for connecting to a fuel filler tube and second surfaces for connecting to a fuel tank spud;
   (b) forming a valve seat on the end of said body proximal said second surfaces;
   (c) forming a plurality of deflectable portions on said body proximal said valve seat;
   (d) forming a flapper with a pair of integral trunnions and disposing a torsion spring over one of said trunnions with one reaction end of said spring contacting said flapper;
   (e) inserting and pivoting said trunnions on said deflectable portions and contacting the exterior of said body with a reaction end of said spring opposite the one end and biasing the flapper in a direction to contact the valve seat.

16. The method defined in claim 15 wherein said step of forming a plurality of deflectable portions includes forming a plurality of fingers and forming an elongated recess in each for pivotally receiving said trunnions.

17. The method defined in claim 15 wherein said step of forming a flapper includes disposing a flexible annular seal on a side of the flapper contacting said valve seat.

18. The method defined in claim 15 wherein said step of disposing a torsion spring includes slidably anchoring said one end to said flapper and forming a sub-assembly.

19. The method defined in claim 15, said step of forming deflectable portions includes forming elongated slots.

20. The method defined in claim 15, wherein said step of forming said second surfaces includes forming surfaces for snap locking with a spud for attachment to the tank.

21. The method defined in claim 15, wherein said step of forming a flapper includes overmolding an annular seal thereon.

22. The method defined in claim 15, wherein said step of forming a flapper includes overmolding a seal formed of one of silicone and neoprene elastomer.

* * * * *